(12) United States Patent
Ekdahl

(10) Patent No.: US 7,413,218 B2
(45) Date of Patent: Aug. 19, 2008

(54) AIRBAG ARRANGEMENT

(75) Inventor: Kalle Ekdahl, Alingsas (SE)

(73) Assignee: Autoliv Development AB, Vårgårda (SE)

( * ) Notice: Subject to any disclaimer, the term of this patent is extended or adjusted under 35 U.S.C. 154(b) by 366 days.

(21) Appl. No.: 10/701,397

(22) Filed: Nov. 4, 2003

(65) Prior Publication Data

US 2004/0130135 A1   Jul. 8, 2004

(30) Foreign Application Priority Data

Nov. 6, 2002  (GB)  ................................. 0225900.0

(51) Int. Cl.
*B60R 21/276*  (2006.01)
(52) U.S. Cl. ...................... 280/739; 280/736
(58) Field of Classification Search ................ 280/739, 280/743.1, 736
See application file for complete search history.

(56) References Cited

U.S. PATENT DOCUMENTS

| | | | |
|---|---|---|---|
| 5,603,526 A * | 2/1997 | Buchanan | .................... 280/739 |
| 5,918,902 A * | 7/1999 | Acker et al. | ............. 280/743.1 |
| 6,126,196 A | 10/2000 | Zimmerman | |
| 6,199,895 B1 | 3/2001 | Seymour | |
| 6,290,257 B1 | 9/2001 | Bunce et al. | |
| 6,648,371 B2 * | 11/2003 | Vendely et al. | ............. 280/739 |
| 6,773,030 B2 * | 8/2004 | Fischer | ....................... 280/739 |
| 6,832,778 B2 * | 12/2004 | Pinsenschaum et al. | ..... 280/739 |
| 6,932,384 B2 * | 8/2005 | Waid et al. | ................... 280/739 |
| 2003/0209895 A1 * | 11/2003 | Gu | ............... 280/739 |
| 2004/0017069 A1 * | 1/2004 | Fischer | ....................... 280/739 |
| 2004/0090054 A1 * | 5/2004 | Bossecker et al. | ........... 280/739 |

FOREIGN PATENT DOCUMENTS

| | | |
|---|---|---|
| DE | 36 18 060 | 12/1987 |
| EP | 0 599 377 | 11/1993 |
| GB | 2 306 409 | 5/1997 |
| GB | 2 338 214 | 12/1999 |
| JP | 1 277991 | 11/1989 |
| WO | WO-03/006276 A2 | 1/2003 |
| WO | WO-03/097407 A2 | 11/2003 |

* cited by examiner

*Primary Examiner*—Kevin Hurley
*Assistant Examiner*—Barry Gooden, Jr.
(74) *Attorney, Agent, or Firm*—Madson & Austin

(57) ABSTRACT

An air-bag is provided with a controllable vent, for example a tube, which is normally maintained in a closed condition by being retained by a clamp. The clamp is opened in response to a signal from a sensor. The clamp may be opened when it is desired for the air-bag to have a "soft" inflation, thus permitting a relatively high rate of flow of gas exiting from the air-bag.

4 Claims, 3 Drawing Sheets

AIRBAG ARRANGEMENT

BACKGROUND OF THE INVENTION

1. Field of the Invention

The present invention relates to an air-bag arrangement, and more particularly relates to an air-bag arrangement intended to provide protection for an occupant of a vehicle in the event that an accident should occur.

2. Description of Related Art

It has been proposed to provide an air-bag which, in the event of an accident situation arising, becomes inflated to provide a protective "cushion" in front of or adjacent an occupant of a motor vehicle. Whilst initially it might be thought that a substantially air-tight air-bag would be preferred, to ensure that the air-bag remains inflated for a maximum period of time, it has been found that it is preferable to include at least one air-vent in an air-bag, since otherwise an occupant would simply rebound from the air-bag when hitting it. An air-bag provided with a vent hole provides an ideal "cushioning" effect, even though the air-bag will, of course, become deflated quite rapidly following deployment of the air-bag. However, air-bags are typically deployed, by appropriate sensors, at such a time that the air-bag is inflated when an occupant of a seat, to be protected by the air-bag, actually moves into contact with the air-bag.

It has now been found that ideally the internal pressure of the air-bag, or the "cushioning" effect provided by the air-bag, should be adjusted in dependence upon various parameters, such as, for example, the size of the seat occupant, the position of the seat occupant and whether the seat occupant is wearing a seat-belt or not. An unbelted seat occupant may require a rather "stiffer" air-bag than a belt seat occupant. Also, a larger occupant requires a "stiffer" air-bag than a smaller occupant. However, an occupant sitting close to the air-bag should be provided with a relatively "soft" air-bag if at all possible.

Attempts have been made to provide air-bags with these characteristics by sensing the relative parameter and by adjusting the amount of gas injected into the air-bag by means of the gas generator. Such arrangements are relatively complex and thus expensive.

SUMMARY OF THE INVENTION

The present invention seeks to provide an improved air-bag arrangement.

According to this invention there is provided an air-bag, the air-bag being provided with a controllable vent formed in the fabric of the air-bag, the vent normally being maintained in a closed condition by a fabric element which is retained by a clamp, the clamp being capable of releasing the fabric element in response to a signal from a sensor.

Preferably the fabric element is in the form of a re-entrant tube extending into the interior of the air-bag, the free end of the tube defining the controllable vent.

Conveniently the tube is formed integrally with the air-bag.

Advantageously the free end of the tube is retained by the clamp.

In one embodiment the free end of the tube is provided with a strap or cord, the strap or cord being retained by the clamp.

In an alternative embodiment the element is an internal fabric flap provided on the interior of the air-bag, the flap covering the interior of the said vent.

Conveniently the sensor is adapted to sense the weight of a seat occupant and/or the position of the seat occupant, and/or whether the seat occupant is wearing a safety-belt.

Preferably with reference to and as shown in FIGS. 1 to 5 of the accompanying drawings.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE PREFERRED EMBODIMENTS

Figure 1:
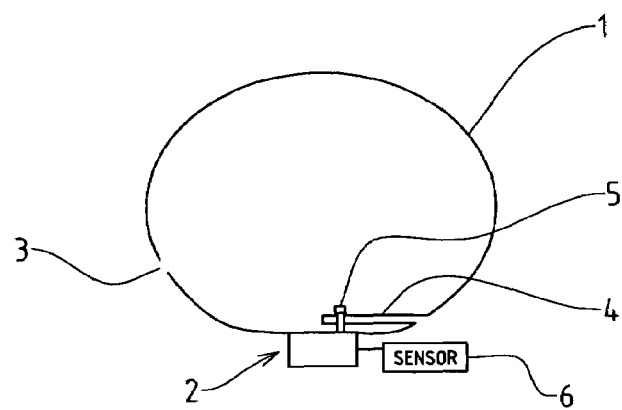
FIG. 1 is a view illustrating a first embodiment of an air-bag in accordance with the invention in a partially inflated state.

Referring initially to FIG. 1 of the accompanying drawings, an airbag I is provided which is associated with a gas generator 2. The air-bag is shown in a partially inflated state.

The air-bag is provided with a fixed or "normal" vent hole 3.

The air-bag of FIG. 1 is provided with a re-entrant fabric tube 4 formed integrally with the fabric of the air-bag which extends into the interior of the air-bag, the inner-most end of the re-entrant tube 4 being retained by a clamp 5 which, in this embodiment, is mounted on the gas generator 2. The tube is thus clamped so that gas cannot flow through it.

A sensor 6 is provided, the sensor 6 only being illustrated schematically. The sensor 6 is a sensor which senses one or more parameters which may be useful in determining the desired degree of "stiffness" or "softness" of the inflated air-bag. Thus the sensor may, for example, sense the weight of the seat occupant, the position of the seat occupant relative to the air-bag, and whether the seat occupant is, or is not belted. Other parameters may be sensed by the sensor.

As will become clear from the following description, the sensor actuates the clamp 5 to release tube 4 when it is determined that a relatively "soft" air bag is required.

Figure 2:
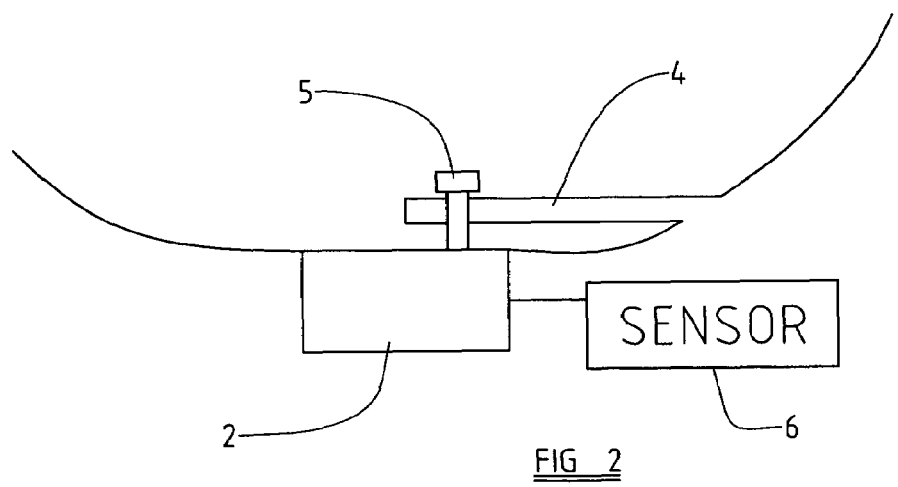
FIG. 2 is an enlarged view of part of the air-bag of FIG. 1.
Figure 3:
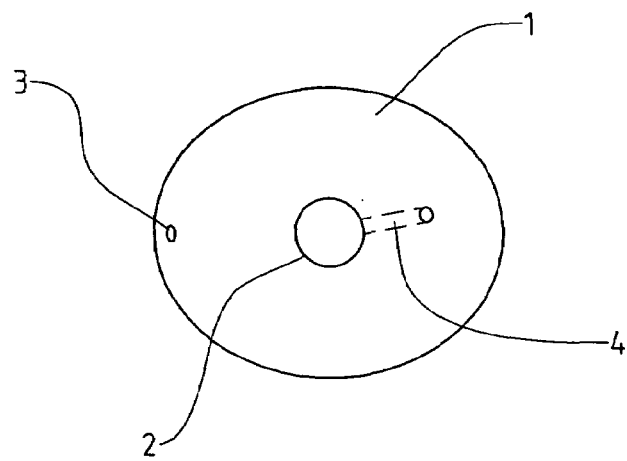
FIG. 3 is an underneath view of the air-bag of FIGS. 1 and 2.

During "ordinary" inflation of the air-bag, when the air-bag is intended to have its "ordinary" stiffness, the clamp 5 is not released. The air-bag then becomes inflated in the ordinary way, as shown in FIGS. 1 and 2. The vent hole 3 provides a path for gas to exit from the interior of the air-bag, and thus when a seat occupant comes into contact with the air-bag, the pressure of gas within the air-bag will, of course, rise, but the gas will be forced out of the vent hole 3, so that the air-bag provides the desired "cushioning" effect.

Figure 4:
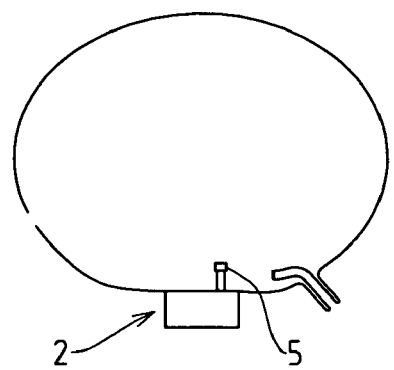
FIG. 4 is a view corresponding to FIG. 1 illustrating a subsequent stage in one exemplary deployment of the air-bag of FIGS. 1 to 3.
Figure 5:
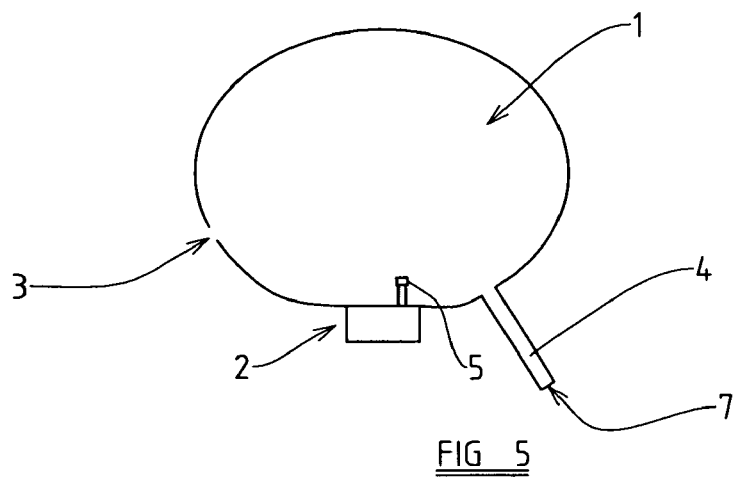
FIG. 5 is a view corresponding to FIG. 4 illustrating a subsequent stage in the deployment of the air-bag.

However, should the sensor 6 determine that a "soft" air-bag is required, when the air-bag is at least partially inflated, the clamp 5 will be released. The pressure of gas within the air-bag will then gradually cause the re-entrant tube 4 to be forced to extend out of the air-bag. If reference is made, for example, to FIG. 4, the tube 4 is illustrated in a partially extended state, in which the tube is "unravelling" to extend to a final position as shown in FIG. 5 in which the initially re-entrant tube 4 is fully extended from the air-bag. The open end 7 of the fully extended tube 4 thus constitutes a further vent hole, permitting the exit of a greater quantity of gas from the air-bag than would be the case if the tube 4 had been retained clamped in the initial position by the clamp 5.

It is, of course, conceivable that a plurality of re-entrant tubes 4 may be provided, each of different diameter, each associated with a separate controllable clamp. The sensor may be able to determine the precise degree of "softness" required, and may select an appropriate clamp or an appropriate combination of clamps to be released so that the combined gas flow path created by the selected tube or tubes will be sufficient to ensure that the appropriate degree of "softness" is exhibited by the air-bag when the seat occupant impacts with the air-bag.

Figure 6:
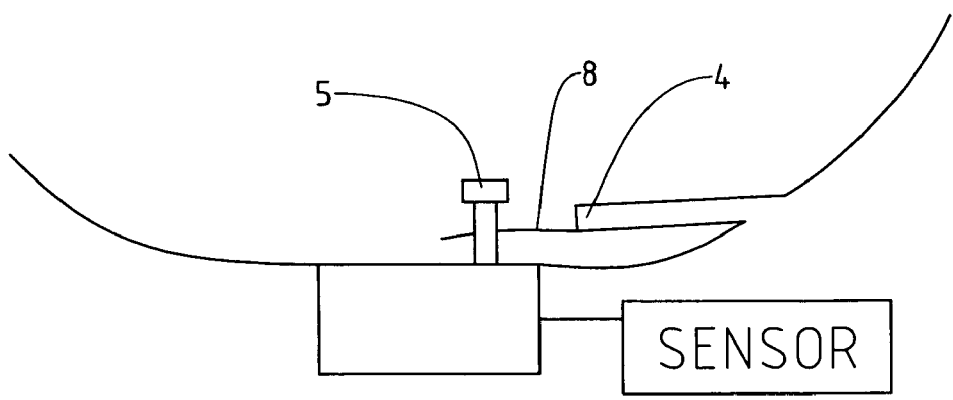
FIG. 6 is a view corresponding to FIG. 2 illustrating a modified embodiment of the invention.

In the embodiment of FIGS. 1 to 5, it is the inner end of the re-entrant tube which is held by the clamp 4. FIG. 6 illustrates a modified embodiment in which the re-entrant tube 4 does not extend as far as the clamp 5, but a strap or cord 8 extends from the end of the tube 4 to the clamp 5. It is to be understood that if the clamp 5 is not released during deployment of the air-bag as shown in FIG. 6, the pressure of gas within the air-bag will tend to flatten the tube 4, thus preventing the exit of gas through the tube 4. It is only if the clamp 5 is released, permitting the tube 4 to unravel, in the manner illustrated in FIG. 4, to extend fully from the air-bag, as shown in FIG. 5, but gas will be able to escape from the interior of the air-bag through the tube 4.

Figure 7:
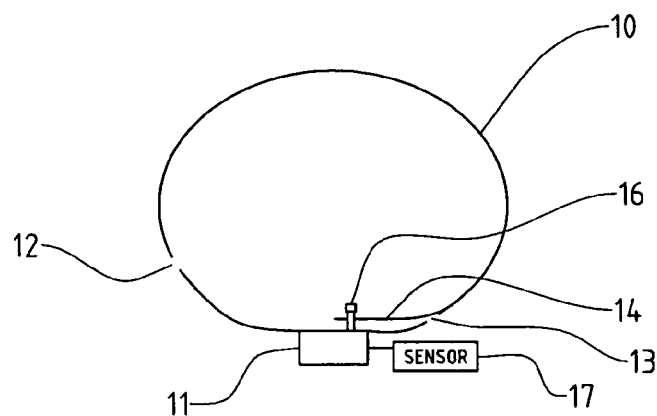
FIG. 7 is a view corresponding to FIG. 1 illustrating a second embodiment of the invention, with the air-bag being shown in a partially inflated situation.
Figure 8:
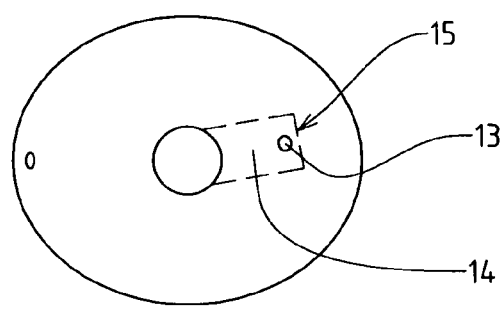
FIG. 8 is an underneath view of the air-bag of FIG. 7.
Figure 9:
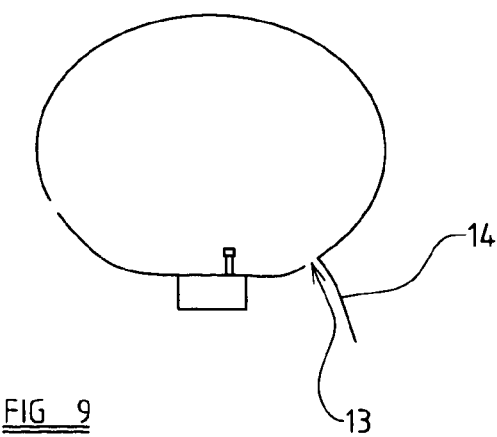
FIG. 9 is a view corresponding to FIG. 7 illustrating the air-bag, during one exemplary inflation, in a subsequent stage.

Turning now to FIGS. 7, 8 and 9, a further embodiment of the invention is illustrated in which, instead of using a re-entrant tube, a vent hole in the bag is initially closed by an internal fabric flap. Thus, referring to FIG. 7, an air-bag 10 is illustrated provided with a gas generator 11, the air-bag having a "ordinary" vent hole 12. The air-bag is also provided with a secondary vent hole 13, the secondary vent hole 13 initially being sealed by means of an internal fabric flap 14. The internal flap 14 has one end thereof 15 (see FIG. 8) secured to the air-bag adjacent the secondary vent hole 13, and the flap 14 extends to a clamp 16 which is shown, in the illustrated embodiment, mounted on the gas generator 11. A sensor 17, corresponding to the sensor 6 described above, is provided.

It is to be appreciated that on "ordinary" deployment of the air-bag of FIGS. 7 to 9, the clamp 15 will not be released, and thus the flap 14 will be pressed against the inside wall of the air-bag surrounding the vent hole 13. The flap 13 will thus seal the vent hole 13, and the air-bag will thus inflate in the "ordinary" way with the "ordinary" vent hole 12 providing the desired degree of venting for the air-bag.

Should the sensor 17 sense a situation in which a "softer" air-bag is required, the clamp 16 will be released during the deployment of the air-bag.

When the gas pressure within the air-bag rises, the gas pressure will cause part of the flap 14 to "bulge" out through the secondary vent hole 13. As pressure continues to rise, the "bulge" will increase in size until the entire flap 14 extends out through the secondary vent hole 13, thus opening the secondary vent hole. This is the situation illustrated in FIG. 9. As will be appreciated, once the secondary vent hole 13 has been opened, more gas will be able to exit from the interior of the air-bag than would be the case if only the "ordinary" vent hole 12 is open, thus providing a somewhat "softer" air-bag.

Again it is to be appreciated that a plurality of secondary vent holes 13 may be provided each associated with a respective flap 14, with each flap being restrained by a corresponding clamp 16. The sensor 17 may be able to calculate the desired degree of softness and thus determine which clamp, or which combination of clamps should be open in order to provide an adequate gas flow path from the interior of the air-bag to ensure that the desired degree of softness for the air-bag is achieved.

It is to be appreciated that it may be appropriate to provide some sort of sealant between the flap 14 and the interior of the air-bag, but the sealant should be "frangible", so that once the clamp 15 is released, the flap 14 will actually pass out through the secondary vent aperture 13 in the manner described above.

In the present Specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed and desired to be secured by United States Letter Patent is:

1. A fabric air-bag, the air-bag being provided with a controllable vent formed in the fabric of the air-bag, the vent normally being maintained in a closed condition by a fabric element which is retained by a clamp, the clamp being capable of releasing the fabric element in response to a signal from a sensor, wherein the fabric element is in the form of a re-entrant tube extending into the interior of the air-bag, the free end of the tube defining the controllable vent and the re-entrant tube being held closed by the clamp prior to deployment of the air-bag so that gas cannot flow through the tube.

2. An air-bag according to claim 1 wherein the tube is formed integrally with the air-bag.

3. An air-bag according to claim 2 wherein the free end of the tube is retained by the clamp.

4. An air-bag according to claim 1 wherein the sensor is adapted to sense the weight of a seat occupant and/or the position of the seat occupant, and/or whether the seat occupant is wearing a safety-belt.

* * * * *